United States Patent [19]

Nagel

[11] 4,239,814
[45] Dec. 16, 1980

[54] METHOD OF PRODUCING ELECTRICALLY INSULATING, HIGHLY FLEXIBLE AND/OR SOLDERABLE COATINGS

[75] Inventor: Klaus Nagel, Wuppertal, Fed. Rep. of Germany

[73] Assignee: Herberts Gesellschaft mit beschrankter Haftung, Wuppertal, Fed. Rep. of Germany

[21] Appl. No.: 938,650

[22] Filed: Aug. 31, 1978

[30] Foreign Application Priority Data

Sep. 19, 1977 [AT] Austria ............................... 126699/77

[51] Int. Cl.$^3$ .......................... B05D 3/02; B05D 7/20; H01B 3/42
[52] U.S. Cl. ................................... 427/120; 260/30.2; 260/32.6 N; 427/105; 427/106; 427/118; 427/121
[58] Field of Search ............... 427/120, 105, 106, 118, 427/120, 121; 260/30.2, 32.6 N

[56] References Cited

U.S. PATENT DOCUMENTS

| | | | |
|---|---|---|---|
| 3,646,374 | 2/1972 | Jordan et al. | 427/105 X |
| 3,732,168 | 5/1978 | Ottmann et al. | 427/120 |
| 3,906,139 | 9/1975 | Hiraoka et al. | 427/118 X |
| 3,917,892 | 11/1975 | Kawaguchi et al. | 427/118 X |
| 3,922,465 | 11/1975 | Kawaguchi et al. | 427/118 X |
| 4,096,291 | 6/1978 | Dunwald et al. | 427/120 |

Primary Examiner—James R. Hoffman
Attorney, Agent, or Firm—Schwartz, Jeffery, Schwaab, Mack, Blumenthal & Koch

[57] ABSTRACT

A method of producing electrically insulating highly flexible and/or solderable coatings on electrical conductors or fibre materials which comprises (A) coating on said conductor or fibre material with a solution comprising:
  (i) isocyanates masked with compounds having reactive hydrogen atoms in the molecule and selected from the group consisting of acid amides having 1 or 2 amide hydrogen atoms, hydroxylamine, reaction products of hydroxylamine with carbonyl compounds, imines having an imine hydrogen atom, and lactams with melting or sublimation points below 25° C.;
  (ii) polyester resins and modified polyester resin selected from the group consisting of imide-modified polyester resins, amide-modified polyester resins and mixtures thereof said polyester resins and modified polyester resins having a content of terminal hydroxyl groups of from 1 to 16% by weight and being derived from compounds selected from the group consisting of polyhydric alcohols, aliphatic carboxylic acids, polybasic carboxylic acids having carboxyl groups bonded to an aromatic ring, and amino group containing compounds; and
  (iii) solvents having from 1 to 10 carbon atoms, a boiling point of at most 250° C. and being selected from the group consisting of araliphatic ketones; aliphatic ketones, araliphatic alcohols, aliphatic alcohols, ether oxygen containing araliphatic alcohols, ether oxygen-containing aliphatic alcohols, aliphatic keto-alcohols, araliphatic keto-alcohols, esterified aliphatic alcohols, and esterified araliphatic alcohols; and
(B) heating to a working temperature of above 140° C., and solutions for use in this method.

10 Claims, No Drawings

METHOD OF PRODUCING ELECTRICALLY INSULATING, HIGHLY FLEXIBLE AND/OR SOLDERABLE COATINGS

The present invention relates to a method of producing electrically insulating, highly flexible coatings as well as to solutions for the preparation of such coatings.

It is known to produce insulating solderable coatings on electrical conductors. The term "solderable" in this context means that when the insulating electrical conductor is immersed in a solder bath heated to an elevated temperature, the insulation is readily destroyed and stripped off, provided that the conductor has been immersed into the bath so that the bare metal is exposed at these points and can be used immediately for electrically conductive connections. For this purpose, it is necessary for the insulating coating to be removed during immersion into the solder bath within a short as possible period, i.e. within a few seconds. The shorter the time, the easier it is to achieve de-insulation and thus a technically advantageous performance. Baths of tin or tin alloy are normally used as solder baths for this purpose context. De-insulation and soldering are carried out in basically the same way when connecting so-called printed circuits to electrical conductors, and this field is of great commercial significance. The insulating solderable coatings on electrical conductors are produced according to the prior art by having the conductors coated with solutions containing compounds having at least two hydroxyl groups as well as masked difunctional or higher functional isocyanates, in which case one of these two components has to be at least partially trifunctional or higher functional, and the coated conductors are heated to temperatures above 250° C. An insulating solderable continuous coating is stoved on to the electrical conductors in this way. The disadvantage of these known coatings is that they are only slightly resistant to heat and to chemicals. However, this is because the coatings have to be destroyed at relatively low temperatures in the solder bath owing to the desired solderability. In this connection, reference is made to German Pat. Nos. 728,981, 756,058, as well as to German Auslegeschriften Nos. 1,074,179, 1,067,549 and 1,249,426.

A wire lacquer for direct soldering with tin is known from German Offenlegungsschrift No. 2,545,912 which is characterised by the combination of the following features:

(a) An OH-group containing polyester of iso- and/or terephthalic acid with an OH-number of 150 to 450.

(b) An isocyanate which is stabilised with lactams, and (c) A solvent from the group consisting of ethers and/or esters of glycols and/or diacetone alcohol.

Only ε-caprolactam is disclosed as a useful lactam therein. This wire lacquer has the disadvantage that the ε-caprolactam released during the stoving process is precipitated into the exhaust channels as a deposit and leads to breakdowns during operation. In addition, a lower draw-off rate is attained when lacquering the conductors this way than with the phenol-masked isocyanates used according to the present state of the art.

It is also known to provide glass fibre fabrics with electrically insulating coatings. For this purpose, the glass fibre fabrics can be impregnated with the insulating lacquer. The glass fibre fabrics can be present in the form of tubes which are grazed over electrical conductors after the production of the electrically insulating coating. Electrical conductors can, however, also be covered with glass fibres by spinning and the electrically insulating coating is produced hereupon. Lacquers based on polyester resins and on isocyanates masked with phenol are used for this purpose.

The use of isocyanates masked with phenol in solderable wire and impregnating lacquers has the disadvantage not only that the phenols liberated during the stoving process cannot be completely consumed with integrated catalytic after-burning in the lacquering installations which are conventional nowadays, but also that extremely small residual quantities lead to considerable undesirable smells. If isocyanates masked with ε-caprolactam are used for such lacquers instead of the isocyanates masked with phenol, the problems discussed above do occur, in particular with respect to the deposition of the ε-caprolactam in exhaust pipes and with respect to reduced lacquering speed.

The object of the present invention, therefore, is to find a method of producing electrically insulating, highly flexible and/or solderable coatings in which the above-mentioned disadvantages are avoided, in particular with respect to unpleasant smell, but which produces coatings having properties which are at least equivalent to those of the coatings obtained according to the prior art.

Accordingly, the present invention provides a method of producing electrically insulating highly flexible and/or solderable coatings on electrical conductors or fibre materials which comprises (A) Coating said conductor or fibre material with a solution comprising:
  (i) isocyanates masked with compounds having reactive hydrogen atoms in the molecule and selected from the group consisting of acid amides having 1 or 2 amide hydrogen atoms, hydroxylamine, reaction products of hydroxylamine with carbonyl compounds, imines having an imine hydrogen atom, and lactams with melting or sublimation point below 25° C.;
  (ii) polyester resins and modified polyester resins selected from the group consisting of imide-modified polyester resins, amide-modified polyester resins and mixtures thereof and, said polyester resins and modified polyester resins having a content of terminal hydroxyl groups of from 1 to 16% by weight and being derived from compounds selected from the group consisting of polyhydric alcohols, aliphatic carboxylic acids, polybasic carboxylic acids having carboxyl groups bonded to an aromatic ring, and amino group containing compounds; and
  (iii) solvents having from 1 to 10 carbon atoms, a boiling point of at most 250° C. and being selected from the group consisting of araliphatic ketones, aliphatic ketones, araliphatic alcohols, aliphatic alcohols, ether oxygen-containing araliphatic alcohols, ether oxygen-containing aliphatic alcohols, aliphatic ketoalcohols, araliphatic keto-alcohols, esterified aliphatic alcohols, and esterified araliphatic alcohols; and (B) Heating to a working temperature of above 140° C.

The present invention also provides a solution for the production of electrically insulating highly flexible and/or solderable coatings on electrical conductors or fibre materials, said solution comprising:

(i) isocyanates masked with compounds having reactive hydrogen atoms in the molecule and selected from the group consisting of acid amides having 1 or 2 amide hydrogen atoms, hydroxylamine, reaction products of hydroxylamine with carbonyl compounds, imines having an imine hydrogen atom, and lactams with melting or sublimation points below 25° C.;

(ii) polyester resins and modified polyester resin selected from the group consisting of, imide-modified polyester resins, amide-modified polyester resins and mixtures thereof, said polyester resins and modified polyester resins having a content of terminal hydroxyl groups of from 1 to 16% by weight and being derived from compounds selected from the group consisting of polyhydric alcohols, aliphatic carboxylic acids, polybasic carboxylic acids having carboxyl groups bonded to an aromatic ring, and amino group containing compounds; and (iii) solvents having from 1 to 10 carbon atoms, a boiling point of at most 250° C. and being selected from the group consisting of araliphatic ketones, aliphatic ketones, araliphatic alcohols, aliphatic alcohols, ether oxygen-containing araliphatic alcohols, ether oxygen-containing aliphatic alcohols, aliphatic keto-alcohols, araliphatic keto-alcohols, esterified aliphatic alcohols, and esterified araliphatic alcohols.

The method according to the present invention can be used for the production of electrically insulating, highly flexible and/or solderable coatings, of the type described, for example, in German Offenlegungsschrift No. 19 57 157. Another field of application involves producing electrically insulating, highly flexible coatings on electrical conductors which are covered with fabrics or threads made, for example, of glass fibres, by spinning.

Another special field of application involves coating tubes, mats or strips consisting of fibrous materials, and substrates such as glass fibre, with solutions according to the invention, for example by impregnation, and then curing them at working temperatures of above 140° C. Mats, strips and tubes of this type which are provided with electrically insulating, highly flexible coatings according to the invention are used, for example, in the building of transformers, coils, motors and the like.

The solutions can optionally contain additives and/or catalysts, as is normal in this technical field. Examples of such additives include organic metal compounds such as zinc octate, zinc resinate, potassium naphthenate, nitrogen-containing organic compounds of the type described in German Offenlegungsschrift No. 23 24 112, dyestuffs and also high-boiling point solvents of markedly polar character as flowing agents and the like.

The polyester resins also known in this technical field from the state of the art may also be used according to the invention as polyester resins, provided that they have a content of from 1 to 16% by weight of terminal hydroxyl groups. Reference is again made to the documents mentioned hereinbefore as well as to German Offenlegungsschrift No. 19 57 157 and to the other documents cited therein. The polyesters generally contain iso- and/or terephthalic acid as aromatic carboxylic acids and, if they are imidemodified, trimellitic acid. Phthalic acid can also be used in addition to the above-mentioned acids, but generally desirably in a smaller quantity.

Suitable aliphatic carboxylic acids include, for example, adipic acid, succinic acid, and hexahydroterephthalic acid.

The other starting products for the production of the polyester resins are also those which are used in this technical field according to the prior art. Examples of polyhydric alcohols include glycol, glycerine, 1,1,1-trimethylol propane, propylene glycol, ethylene glycol, 1,2- and 1,3-propane diol and butane diol-(1,4), 1,1,1-trimethylolethane.

Compounds containing amino groups are, for example, those with one or two amino groups such as p, p'-diaminodiphenylmethane, alkanolamine and hexamethylenediamine, which are bonded at aromatic or aliphatic groups.

Intermediate products containing five-membered imide rings are frequently formed in the first instance from the starting products during the production of imide-modified polyester resins. These intermediate products then react with the other starting materials. This is known from the prior art.

According to the invention, the compounds defined above are used as masked isocyanates.

Examples of acid amides include formamide, acetamide, acetanilide, acetanisidinamide, acrylamide, methacrylamide, benzamide and stearic acid amide.

Examples of carbonyl compounds which can be reacted with hydroxyl amines include aliphatic aldehydes and ketones which preferably contain aliphatic groups with 1 to 4, particularly preferably 1 to 2 carbon atoms bounded at the carbonyl group. Examples of such compounds include methylethyl ketone, acetone, cyclohexane, benzophenone, formaldehyde, acetaldehyde, and propionaldehyde.

These carbonyl compounds produce oximes during the reaction with hydroxylamine. Moreover, hydroxylamine itself is equally suitable.

Examples of imines include aldimines, and ketimines, i.e. the reaction products of ammonia with the carbonyl compounds defined above, which are resistant as such.

α-Pyrrolidone is an example of a lactam with a melting or sublimation point below about 25° C.

Isocyanates which are masked with the above-mentioned compounds with reactive hydrogen in the molecule surprisingly produce electrically insulating, highly flexible and/or solderable coatings with excellent mechanical and electrical properties, while, on the other hand, avoiding the disadvantages described hereinbefore.

Examples of isocyanates which are masked according to the invention with the compounds defined above include difunctional or higher functional isocyanates of the type used—but masked with phenol—according to the prior art for the production of electrically insulating coatings. Suitable isocyanates of this type include, for example, the reaction product of 1 mol of trimethylol propane with 3 mol of 2,4-toluylene-diisocyanate and/or 2,6-toluylene-diisocyanate ("Desmodur T 100" and the mixture "Desmodur T 65" and "Desmodur P 80"). Other trifunctional alcohols such as trimethylol ether or tris-(2-hydroxyethyl-isocyanurate can be used instead of trimethylol propane.

The solvents used according to the invention are araliphatic and/or aliphatic alcohols with 1 to 10 carbon atoms and a boiling point of at most 250° C.

Examples of alcohols include ethanol, n-butanol, iso-butanol, n-propanol, iso-propanol and benzylalcohol. These substances can optionally contain ether oxygen atoms and/or can be esterified. If they contain ether oxygen atoms, their number preferably is not above 3. Examples of such compounds include ethylglycol, methylglycol, propylene glycol, methyl diglycol, ethyl diglycol, diglycoldimethylether, and butyldiglycol.

If the alcohols are esterified, the acids present in the ester groups are preferably aliphatic carboxylic acids with from 1 to 5 carbon atoms. Acetic acid and propionic acid are preferred. Examples of esters include isobutyl acetate, methyl acetate, ethyl acetate, propyl acetate, butyl acetate, ethyl diglycol acetate, ethylglycol acetate, ethyl glycol acetate, and methyl glycol acetate.

Examples of ketones include cyclohexanone, methylisoethylketone, methylethylketone, and methylisobutylketone.

Examples of ketoalcohols include diacetone alcohol, and isophorone.

Based on 1% by weight of the solvents defined above, the solutions according to the invention can contain as diluent, up to 1.5 parts by weight of aromatic hydrocarbons which contain no phenolic hydroxyl groups and which have a boiling point below about 250° C.

The solutions according to the invention surprisingly have a low viscosity although they have a high solids content, and they are thus superior to the solutions of the prior art which contain isocyanates masked with phenol. This is, for example, of particular advantage during the impregnation of fabrics. Owing to the high solids content of the solutions according to the invention, fewer procedures are required to achieve an adequate impregnation and insulating capacity of the fabrics.

The solutions according to the invention therefore preferably contain at most about 50% by weight, preferably at most about 35% by weight and particularly preferably at most about 25% by weight of solvent based on the total weight of the solution. This applies to solutions which are suitable for the production of highly flexible coatings. If solderable coatings are to be produced, the solvents content is generally somewhat higher, and preferably at most about 60% by weight, preferably at most 50% by weight and particularly preferably at most about 30% by weight. The lower limit for the solvents content of solderable wire lacquers according to the invention is about 20% by weight, preferably about 25% by weight. With highly flexible wire lacquers according to the invention, the minimum solvents content beneficially is about 15% by weight, preferably about 20% by weight.

About one masked isocyanate group preferably falls onto a hydroxyl group of the polyester resins. A slight deficit or excess is possible. In order to obtain highly flexible coatings, it is beneficial to use those polyester resins which have a terminal hydroxyl groups content in the lower range, as defined above. In order to obtain solderable coatings, the terminal hydroxyl groups content beneficially lies in the upper range. If a coating which is both solderable and highly flexible is desired, a terminal hydroxyl groups content in the mid range is selected. The said lower range preferably ends at about 12% by weight, preferably at about 10% by weight and particularly preferably at about 8% by weight of terminal hydroxyl groups. The said upper range preferably begins at about 8% by weight, preferably about 10% by weight, particularly preferably about 12% by weight of terminal hydroxyl groups. The mid range is beneficially limited by these respective values.

The following examples illustrate the production of masked isocyanates and polyester resins.

EXAMPLE A

Production of stabilised isocyanate:

973 parts by weight of a reaction product of 3 mol of toluylene diisocyanate and 1 mol of trimethylol propane is dissolved in ethyl glycol acetate and diacetone alcohol to form a 64% solution and this is heated with 274 parts by weight of methylethylketoxime for about 2 hours at about 100° C.

EXAMPLE B

Production of hydroxyl polyester based on isophthalic acid for solderable coatings:

507 parts by weight glycerine,
383 parts by weight ethylene glycol,
3 parts by weight zinc acetate,
555 parts by weight terephthalic acid dimethylester, and
942 parts by weight isophthalic acid are condensed at temperatures of up to 220° C. The polyester obtained has a content of about 10% by weight of terminal hydroxyl groups.

EXAMPLE C

A hydroxyl polyester is produced from 3 mol of butylene glycol, 3 mol of adipic acid and 1 mol of 1,1,1-tris(hydroxylmethyl)-propane, in the manner described in Houben-Weyl "Methoden der organischen Chemie", volume 14/2, "Polyester für Polyurethane". This hydroxyl polyester has the composition of Desmophen 1200 produced by Bayer AG, Leverkusen, which is described therein. This polyester contains about 5.8% by weight of terminal hydroxyl groups.

EXAMPLE D 507 parts by weight glycerine,
310 parts by weight ethylene glycol,
91 parts by weight propylene glycol,
555 parts by weight terephthalic acid dimethylester,
730 parts by weight isophthalic acid,
253 parts by weight diaminodiphenylmethane,
492 parts by weight trimellitic acid anhydride, and
2 parts by weight zinc acetate are condensed at temperatures of up to 220° C. The polyester contains about 8% by weight of terminal hydroxyl groups.

The following examples illustrate solutions according to the invention and their use for the production of coatings.

EXAMPLE 1

422 parts by weight of the solution of a stabilised isocyanate produced according to Example A,
130 parts by weight polyester according to Example B,
170 parts by weight methyldiglycol, and
98 parts by weight xylene are dissolved to a lacquer having a viscosity of about 40 DIN seconds in order to produce a solderable wire lacquer.

If a lacquer produced according to the prior art, using the same polyester with phenol-masked isocyanate is to be produced with viscosity of about 40 DIN seconds, the solvents content must be increased by at least about 5 parts by weight, based on the total amount of solution.

EXAMPLE 2

385 parts by weight of the solution of stabilised isocyanates produced according to Example A,
260 parts by weight of the polyester produced according to Example C,
150 parts by weight of methyldiglycol, and
205 parts by weight of xylene
are dissolved to form a lacquer with a viscosity of about 50 DIN seconds for the production of lacquer forming highly flexible coatings.

If an impregnating lacquer produced according to the prior art with phenol-masked isocyanate is to be obtained with a viscosity of about 50 DIN seconds, the solvents content must be increased by at least about 10 parts by weight, based on the total weight of the solution.

EXAMPLE 3

422 parts by weight of the solution of the stabilised isocyanate obtained according to Example A,
162 parts by weight of the polyester obtained according to Example D,
170 parts by weight benzylalcohol, and
100 parts by weight of xylene
are dissolved to form a lacquer having a viscosity of about 50 DIN seconds in order to produce a solderable wire lacquer.

EXAMPLE 4

A copper wire with a diameter of 0.35 mm is coated with a solution produced according to Example 1 in six passages in a horizontal wire lacquering furnace, 175 cm long, and is heated to a working temperature of about 22° C. The draw-off rate amounts to between 40 and 44 m/min. The furnace temperature amounts to between about 450° and 500° C. A lacquer produced in the same manner as in Example 1 but in which an isocyanate masked with ε-caprolactam has been used can be lacquered only at a maximum draw-off rate of about 36 to 38 m/min under the conditions indicated in this example.

It is preferable for the isocyanates to be those whose isocyanate groups are bonded to aromatic rings. The aromatic rings can be either uninuclear or polynuclear. Isocyanates having -NCO- groups bonded to the naphthalene group or to the benzene ring are preferred. In addition these aromatic ring systems can carry substituents, in particular lower alkyl groups, and in particular methyl groups.

A particular advantage of the method according to the present invention is that during the stoving process, the furnace temperature can be lowered by at least about 20° C. relative to the use of cresolic solvents and masking agents, or that the lacquering speed can be increased at about 20° to 25° C. A smaller reduction in the furnace temperature can of course be obtained with a smaller increase in the lacquering speed. These advantages are of considerable importance and interest, in particular from the energy conservation viewpoint. It could not be anticipated that this advantage could be achieved when using the masking agents for isocyanates and the special solvents according to the present invention.

What is claimed is:

1. A method of producing electrically insulating highly flexible and/or solderable coatings on electrical conductors or fibre materials which comprise
  (A) coating said conductor or fibre material with a solution comprising:
    (i) isocyanates masked with compounds having reactive hydrogen atoms in the molecule and selected from the group consisting of acid amides having 1 or 2 amide hydrogen atoms, hydroxylamine, reaction products of hydroxylamine with carbonyl compounds, imines having an imine hydrogen atom, and lactams with melting or sublimation points below 25° C.;
    (ii) polyester resins and modified polyester resins selected from the group consisting of imide-modifed polyester resins, amide-modified polyester resins and mixtures thereof, said polyester resins and modified polyester resins having a content of terminal hydroxyl groups of from 1 to 16% by weight and being derived from compounds selected from the group consisting of polyhydric alcohols, aliphatic carboxylic acids, polybasic carboxylic acids having carboxyl groups bonded to an aromatic ring, and amino group containing compounds; and
    (iii) solvents having from 1 to 10 carbon atoms, a boiling point of at most 250° C. and being selected from the group consisting of araliphatic ketones, aliphatic ketones, araliphatic alcohols, aliphatic alcohols, ether oxygen-containing araliphatic alcohols, ether oxygen-containing aliphatic alcohols, aliphatic keto-alcohols, araliphatic keto-alcohols, esterified aliphatic alcohols, and esterified aliphatic alcohols, and
  (B) heating to a working temperature of above 140° C.

2. A method according to claim 1, characterised in that one or more of the components (i) to (iii) contains at least one compound having at least one five-membered imide ring.

3. A method according to claim 1, characterised in that the solution further comprises compounds selected from the group consisting of catalysts, additives and auxiliary material.

4. A method according to claim 1, characterised in that the isocyanate are masked with aliphatic oximes.

5. A method according to claim 1, characterised in that the isocyanates are those having isocyanate groups bonded to aromatic rings.

6. A solution for the production of electrically insulating highly flexible and/or solderable coatings on electric conductors or fibre materials, said solution comprising:
  (i) isocyanates masked with compunds having reactive hydrogen atoms in the molecule and selected from the group consisting of acid amides having 1 to 2 amide hydrogen atoms, hydroxylamine, reaction products of hydroxylamine with carbonyl compounds, imines having an imine hydrogen atom, and lactams with melting or sublimation points below 25° C.;
  (ii) polyester resins and modified polyester resins selected from the group consisting of imide-modified polyester resins, amide-modified polyester resins and, mixtures thereof, said polyester resins and modified polyester resins having a content of terminal hydroxyl groups of from 1 to 16% by weight and being derived from compounds selected from the group consisting of polyhydric alcohols, aliphatic carboxylic acids, polybasic carboxylic acids having carboxyl groups bonded to an aromatic ring, and amino group containing compounds; and (iii) solvents having from 1 to 10 carbon atoms, a boiling point of at most 250° C. and being selected from the group consisting of araliphatic ketones, aliphatic ketones, araliphatic alcohols, aliphatic alcohols, ether oxygen-containing araliphatic alcohols, ether oxygen-containing aliphatic alcohols, araliphatic ketoalcohols, esterified aliphatic alcohols, and esterified araliphatic alcohols.

7. A solution according to claim 6, characterised in that one or more of the components (i) to (iii) contains at least one compound having at least one five-membered imide ring.

8. A solution according to claim 6, characterised in that it further comprises compounds selected from the group consisting of catalysts, additives and auxiliary materials.

9. A solution according to claim 6 characterised in that the isocyanate are masked with aliphtic oximes.

10. A solution according to claim 6 characterised in that the isocyanates are those having isocyanate groups bonded to aromatic rings.

* * * * *